United States Patent
Deisenhofer et al.

[11] Patent Number: 5,808,411
[45] Date of Patent: Sep. 15, 1998

[54] FLUORESCENCE-SUPPRESSED QUARTZ GLASS, AND ELECTRIC LAMP WITH THIS QUARTZ GLASS

[75] Inventors: Manfred Deisenhofer, Altenmuenster; Dieter Meiss, Tuebingen; Ekkehard Messner, Augsburg, all of Germany

[73] Assignee: Patent-Treuhand-Gesellschaft F. Elektrische Gluehlampen mbH, Munich, Germany

[21] Appl. No.: 759,439

[22] Filed: Dec. 5, 1996

Related U.S. Application Data

[63] Continuation-in-part of Ser. No. 439,472, May 11, 1995, Pat. No. 5,589,734.

[30] Foreign Application Priority Data

May 25, 1994 [DE] Germany .......................... 44 18 198.1

[51] Int. Cl.$^6$ ................ H01J 1/62; H01J 63/04
[52] U.S. Cl. .......................................... 313/493
[58] Field of Search ...................... 313/487, 493, 313/632, 636, 112, 580, 579; 501/54, 905, 152, 153, 134; 428/34.4

[56] References Cited

U.S. PATENT DOCUMENTS

| | | |
|---|---|---|
| 1,634,182 | 6/1927 | Gell et al. . |
| 3,527,711 | 9/1970 | Barber et al. . |
| 4,501,993 | 2/1985 | Mueller et al. ................ 315/248 |
| 4,769,292 | 9/1988 | Tang et al. ..................... 313/504 |
| 5,196,759 | 3/1993 | Parham et al. . |
| 5,231,328 | 7/1993 | Hisamune et al. ............ 313/487 |

FOREIGN PATENT DOCUMENTS

| | | |
|---|---|---|
| 0 032 763 B1 | 7/1981 | European Pat. Off. . |
| 0 048 059 A1 | 4/1992 | European Pat. Off. . |
| 0 527 461 A3 | 2/1993 | European Pat. Off. . |
| 0 574 158 A1 | 12/1993 | European Pat. Off. . |
| WO 91/11401 | 8/1991 | WIPO . |

*Primary Examiner*—William L. Oen
*Attorney, Agent, or Firm*—Frishauf, Holtz, Goodman, Langer & Chick, P.C.

[57] ABSTRACT

To inhibit, or at least sharply attenuate, fluorescence of a quartz-glass envelope (10) surrounding a light source (11), such as a halogen incandescent lamp, a high-pressure discharge lamp, or the like, when the quartz glass is subjected to ultraviolet (UV) radiation from the light source, and has been doped with a UV radiation absorbing material, typically a cerium, or cerium-titanium doping, the quartz-glass envelope is additionally doped with barium and boron. The barium/boron in the doping is, preferably, present in quantities of between about 0.008 and 1.25%, by weight, with reference to the undoped quartz glass. Barium metaborate can be used, optionally together with praseodymium to attenuate the fluorescence. Preferably, barium and boron form a combined doping substance with cerium, in form of a cerium aluminate and metaborate, added to the starting material for the quartz glass, and before the quartz glass is fused from quartz sand or pulverized quartz crystal.

14 Claims, 11 Drawing Sheets

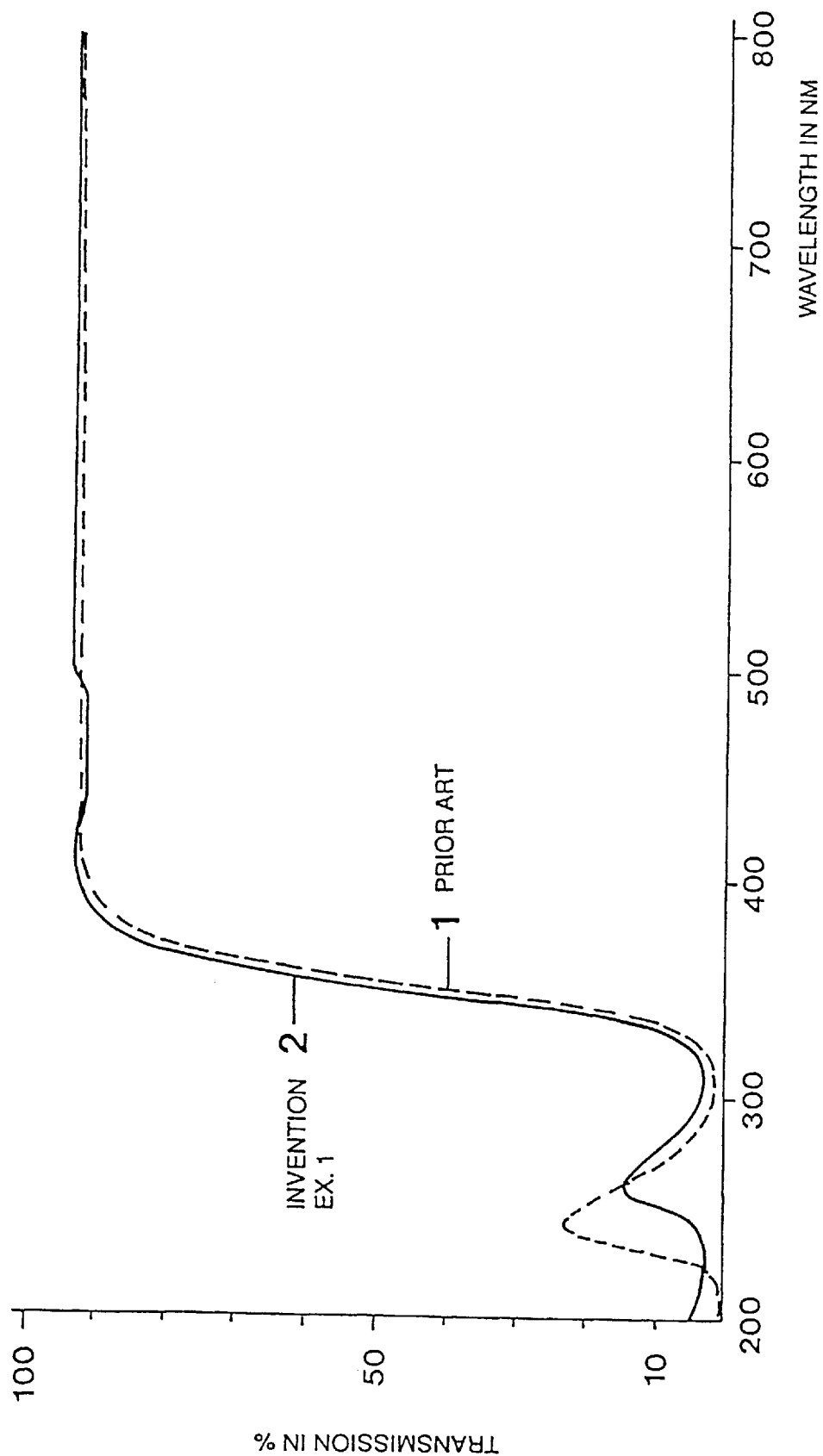

FLUORESCENCE-SUPPRESSED QUARTZ GLASS, AND ELECTRIC LAMP WITH THIS QUARTZ GLASS

This application is a Continuation-in-Part of Ser. No. 08/439,472, filed May 11, 1995, issued as U.S. Pat. No. 5,589,734, Dec. 31, 1996.

Reference to related patent and application, the disclosures of which are hereby incorporated by reference:
U.S. Pat. No. 4,361,779, van der Steen et al.;
U.S. Pat. No. 5,196,759, Parham et al.;
U.S. Pat. No. 5,464,462, Langer et al., assigned to the assignee of the present application.
Reference to related publication:
European 0 478 059 A1, van Hal et al.

FIELD OF THE INVENTION

The present invention relates to an electric lamp having a bulb made of quartz glass which, in operation, has a tendency to fluoresce, in which the quartz glass is fluorescence-suppressed; and to quartz glass for such a bulb. The quartz-glass bulb is particularly suitable for making discharge vessels for discharge lamps, for making outer envelopes for high-pressure discharge lamps, and to make the bulb for halogen incandescent lamps.

In this specification, description and claims to follow, all percentages are understood to be by weight, unless otherwise noted.

BACKGROUND

Vessels or bulbs to enclose discharges or filaments, particularly high-pressure discharge lamps and halogen incandescent lamps, are subject to high thermal loading. To make such vessels, light-transmissive ceramics can be used, as well as quartz glass. Pure quartz glass which has a purity of up to about 99.99 mol-% silicic acid is transparent not only for visible light, but also for ultraviolet (UV) radiation. It is necessary to substantially attenuate UV radiation which, as radiated, is a health hazard. One possibility is to dope the quartz glass which is used as the envelope or bulb for a discharge lamp or for halogen incandescent lamps with suitable dopings which substantially reduce the emitted UV radiation to a safe level. Selection of doping materials, as well as concentration thereof, requires care since the physical characteristics of the quartz glass, for example viscosity, transparency, coloring of the glass, and tendency to crystallization, should not disadvantageously affect the characteristics of the lamp by the doping. Doping materials which are suitable are, primarily, cerium, added as an oxide, a silicate or an aluminate to the quartz powder which is prepared prior to melting the powder to form the quartz glass. A small further addition of titanium, added in the form of titanium oxide, additionally attenuates the particularly dangerous short-wave portion of the UV radiation.

The referenced U.S. Pat. No. 5,196,759, Parham et al., describes a quartz glass which is doped with up to 0.5% cerium oxide and additionally with titanium oxide. The cerium oxide corresponds to a cerium proportion of about 0.41%, by weight.

European 0 478 059 A1, van Hal, describes a quartz glass having a UV radiation absorbing doping formed of 0.1 mol-% cerium disilicate and 0.01 mol-% titanium oxide. This corresponds to a cerium portion within the quartz glass of about 0.47%, by weight.

UV radiation can be more attenuated with a higher proportion of cerium. Quartz glass with such higher cerium concentration is described in the referenced U.S. Pat. No. 5,464,462, Langer et al., assigned to the assignee of the present application. Higher doping with cerium ensures that the dangerous UV radiation is sufficiently absorbed even if the bulbs or vessels are very thin. Cerium aluminate and titanium oxide are described in that patent.

The absorption edge of the quartz glass is set to a wavelength of about 350 nm by such cerium-titanium doping. This reduces the transparency of the quartz glass for the undesired, potentially dangerous UV radiation to a tolerable level. Any remanent UV transparency of the quartz glass at wavelengths in the region of about 245 nm can be removed by glowing or annealing the quartz glass for several hours in an $O_2$ atmosphere.

The cerium in the glass emits a blue fluorescent radiation, stimulated by the UV radiation. This blue radiation can be utilized to improve the color rendition of electrical lamps within the blue spectral range, as described in the above-referenced publications and the application. In some uses, however, such additional blue component is not desired. For example, when using high-pressure discharge lamps in vehicular headlights, such increase of blue light component is undesired. What fluoresces is not the filament but the envelope or bulb, that is, the bulb with the cerium therein. When such a bulb is inserted in a reflector, or a similar optical system with specifically directed light emission, the blue fluorescence leads to an increase in stray light, which spreads the otherwise sharp light/dark boundary of the desired emitted light beam. For applications where only light from the emitted light source is desired, the fluorescent radiation of the cerium in the bulb is undesired.

U.S. Pat. No. 4,361,779, van der Steen et al., to which European 0 032 763 B1 corresponds, describes a quartz glass having a doping which suppresses UV radiation. The glass has 0.1 to 3% alkali metal oxide, 0.2 to 5% of a rare-earth metal oxide, and 0 to 0.5% of an alkaline earth metal oxide. Praseodymium oxide ($PrO_2$) or europium oxide ($Eu_2O_3$) are proposed; the alkali metal oxide is listed as potassium oxide ($K_2O$) in the examples. The rare-earth metal oxide functions as an absorber for UV radiation. The alkali metal oxide enhances the solubility of the rare-earth metal oxide in the quartz glass. The so doped quartz glass has an absorption edge and a wavelength of about 250 nm, that is, radiation with a wave length below 250 nm is absorbed in the quartz glass; the quartz glass is transparent for radiation having a wavelength higher than 250 nm. The UV radiation in the wavelength range of between 350 nm and 250 nm is transmitted with hardly any attenuation. Consequently, this quartz glass is entirely unsuitable as a bulb or a discharge vessel enclosure for high-pressure discharge lamps, nor for an outer envelope or shield therefor. Besides these dopings, UV radiation with a wavelength of above 250 nm must also be suppressed.

THE INVENTION

It is an object to provide lamps having a light source which provides, besides visible light, radiation in the UV spectral range, in which the lamp has very low or practically no UV radiation at all, and further does not emit fluorescent radiation within the visible spectral range; and specifically a glass suitable for such a bulb or vessel or envelope which has this low transparency in the UV spectral range without fluorescent radiation, and which is suitable for making discharge vessels for high-pressure discharge lamps, outer envelopes or shield elements for high-pressure discharge lamps, or bulbs for halogen incandescent lamps, for example.

Briefly, the lamp has a bulb or discharge vessel which is doped with cerium to suppress UV radiation and, in order to highly attenuate the blueish fluorescent radiation stimulated in the cerium by the UV radiation from the light source, the bulb or vessel is additionally doped with barium and boron. The bulb or vessel may, optionally, also be doped with praseodymium oxide ($PrO_2$), or a praseodymium compound, as fully explained in U.S. Pat. No. 5,589,734, by the inventors hereof. In accordance with the present invention, praseodymium is not a necessary element.

In accordance with a feature of the invention, the doping substances and quantities are so controlled that the absorption edge of the quartz glass is at about 350 nm, so that practically no UV radiation is transmitted or if so, only in an amount which is readily tolerated. The barium and boron addition in the quartz glass quenches the fluorescence of the cerium. The probability of radiating transitions within the atomic spectrum of the cerium decreases substantially and, consequently, the probability of transition of the cerium ions, excited by the UV radiation without causing external radiation, is correspondingly increased. The barium and boron also absorbs UV radiation, so that the proportion of cerium can be decreased as the barium and boron proportion increases, thereby further decreasing the tendency of the glass to fluoresce.

Preferably, cerium is added to quartz powder in the form of aluminate and the barium and boron in form of barium metaborate before the quartz powder is fired to make the glass. These compounds have the advantage with respect to oxides, and particularly with respect to the four-valent cerium oxide ($Ce_2O_4$), that, if the fusing of the quartz powder is carried out in a tungsten boat, no oxygens will be liberated which, otherwise, might oxidize the tungsten boat. Any aluminum which is added by the aluminate increases the solubility of the cerium as well as that of praseodymium, if any is also used within the quartz glass, so that a pure cerium, and praseodymium portion (if any) of up to 1.25% by weight, with reference to undoped quartz glass, can be obtained in the quartz glass, without non-homogeneous regions occurring within the quartz glass.

The quartz glass for use in the lamps of the present invention may have a small addition of titanium doping, which further improves the absorption of short-wave UV radiation, that is, UV radiation within the UV-C range of the quartz glass. The curves in the Figures, and particularly curve 2 in FIG. 1B, show that the quartz glass doped in accordance with the present invention with cerium and praseodymium, and FIG. 6, quartz glass doped with cerium barium and boron, has sufficient absorption, especially in the shortwave UV range. The barium/boron optionally with praseodymium, if any, acts, thus, not only as inhibiting fluorescence, but further as an absorption element for the short-wave UV radiation.

In accordance with a feature of the invention, the addition of barium metaborate decreases the viscosity of quartz glass. This permits simpler and more energy efficient handling. The barium/boron addition, however, decreases the capability of thermal loading of the quartz glass. A quartz glass which has the barium/boron addition, thus, is highly suitable for an outer shield or shroud for high-pressure discharge lamps, or for thermally lightly loaded bulbs of halogen incandescent lamps where very high temperature resistance is not required.

DRAWINGS

FIG. 1A is a highly schematic illustration of a lamp having a quartz-glass bulb or discharge vessel in which UV radiation as well as fluorescence is effectively suppressed;

FIG. 1B shows transmission curves, with respect to wavelengths (abscissa), for a quartz glass doped with cerium and titanium (0.5% $CeAlO_3$ and 0.04% $TiO_2$) in accordance with the prior art (graph 1) and a quartz glass doped with cerium-praseodymium aluminate (1.25% $Ce_{0.4}Pr_{0.6}AlO_3$) (graph 2);

FIG. 2 illustrates radiation transmission curves for a quartz glass doped with cerium titanium (1% $CeAlO_3$ and 0.05% $TiO_2$) in accordance with the prior art (graph 1) and a quartz glass with cerium-praseodymium aluminate (1.17% $Ce_{0.6}Pr_{0.4}AlO_3$) (graph 2), and illustrating another embodiment of the present invention;

DETAILED DESCRIPTION

Figure 1A:
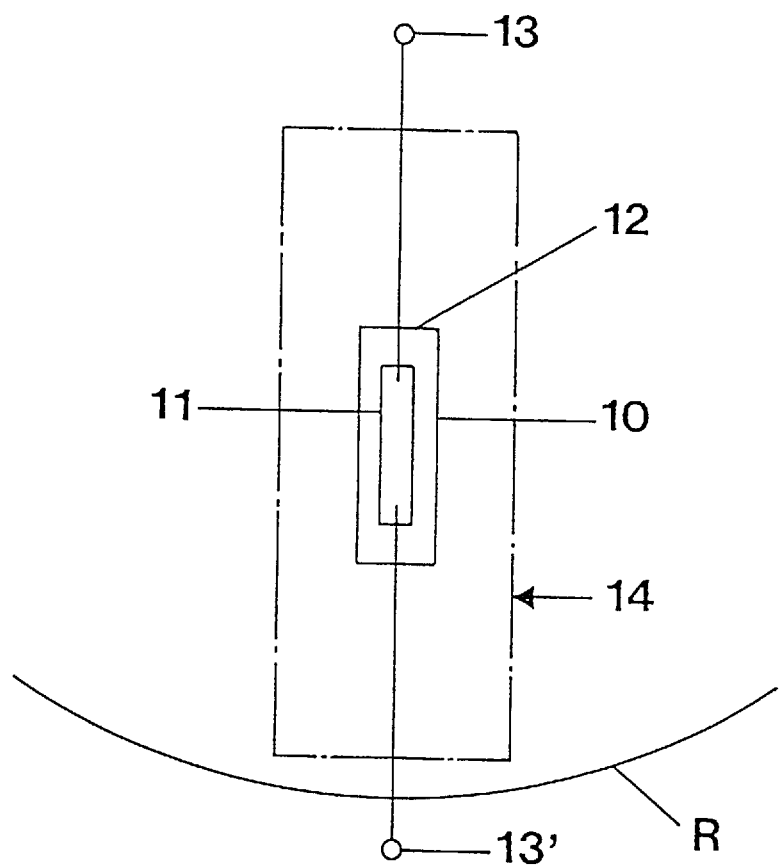

Referring first to FIG. 1A:

The lamp 12, in accordance with the present invention, has a lamp bulb or vessel 10 which encloses a suitable light source 11. The light source 11, shown only schematically in block form, may for example be an incandescent filament, and the bulb or vessel 10 retains a fill which includes halogen, so that the filament operates in a halogen regenerative cycle. The light source 11 may, however, also be a high-pressure discharge lamp, in which case the envelope 10 will retain a suitable fill therein which can be excited by an arc discharge. The lamp 12, constituted by the envelope 10 and the light source 11, can be connected to a suitable electric supply at terminals 13, 13'. If the lamp 12 is a high-pressure discharge lamp which, due to its power rating or construction, is subject to possible explosion or implosion, it can be surrounded, as well known, by a shield or shroud or outer envelope 14.

The lamp 12 is shown only schematically. The envelope, of course, could be part of an optical system, e.g. a reflector structure R, shown only schematically in fragmentary form—see, for example, the referenced U.S. Pat. No. 5,196,759, Parham et al. In such a structure, it is important that the light source 11 is located at a specific optical point in the optical system, for example at or near the focal point of the reflector, and no light be emitted from the bulb or vessel structure 10 itself.

The starting material to make the bulb 10, which is made of quartz glass, is quartz sand and/or rock crystal. This material has more than 99.9 mol-% silicic acid ($SiO_2$). The material is pulverized, and the doping substances, likewise pulverized, are added to the quartz sand or pulverized rock crystal before the quartz glass is made. They are homogenized with the starting material.

EXAMPLE 1

With Reference to FIG. 1:

Quartz sand or pulverized rock crystal forms the starting material, to which 1.25% by weight of cerium-praseodymium aluminate ($Ce_{0.4}Pr_{0.6}AlO_3$) are added as a doping material.

The wall thickness of quartz-glass samples, made from the melted quartz glass, is about 1 mm.

In this example, the mol relationship of cerium to praseodymim in the cerium-praseodymium aluminate compound is 2/3. The pure cerium proportion within the quartz glass can be calculated to about 0.32%, by weight, and the pure praseodymium proportion to about 0.49%, by weight.

FIG. 1B shows the contrast in the transmission behavior, with respect to wavelength, of quartz glass doped in accordance with this example, in comparison to a quartz glass doped only with cerium-titanium in accordance with the prior art, and illustrating specifically the spectral range of between 200 nm and 800 nm. Thus, the spectral ranges which are tested are the short-wave UV-C radiation band, the UV-B radiation band, as well as the UV-A radiation band, and the visible spectral range. The transmission is shown on the ordinate in percent transmission and relates to the intensity of the radiation applied to the quartz-glass sample. Approximately 6.5% of the applied radiation is reflected, so that a transmission ratio of 93.5% means that, with the respective radiation wavelength, the radiation can pass through the quartz glass without attenuation.

Curve 1 in FIG. 1B shows the transmission behavior for quartz glass in accordance with the prior art, that is, a comparable starting material which is doped with 0.5% cerium aluminate ($CeAlO_3$) and 0.046 titanium dioxide ($TiO_2$), which corresponds to a pure cerium proportion of about 0.33%. Curve 2 shows the transmission characteristics of the quartz glass doped in accordance with Example 1 of the present invention.

A comparison will clearly show that, within the visible spectral range above about 350 nm, both samples have a transmissivity of more than 90%. In the UV spectral range, that is, below about 350 nm, the transmissivity drops to values of below 5%. There is an increased remaining transmission in wavelengths in the range of about 240 nm and 270 nm, respectively. In the cerium-titanium doped quartz glass, this remaining transmission is about 25%; in the glass in accordance with the present invention, due to the addition of the praseodymium, only about 15%.

The still high remaining transmission at 245 nm wavelength can, in the glass in accordance with the prior art, be reduced or effectively eliminated by heating the glass to glow temperature in an oxygen atmosphere. Apart from this remaining transmission, both quartz-glass samples have roughly comparable good absorption characteristics within the UV region and good transmission characteristics within the visible spectral range. A substantial difference between the two samples, however, is in the behavior with respect to fluorescence.

Figure 4:
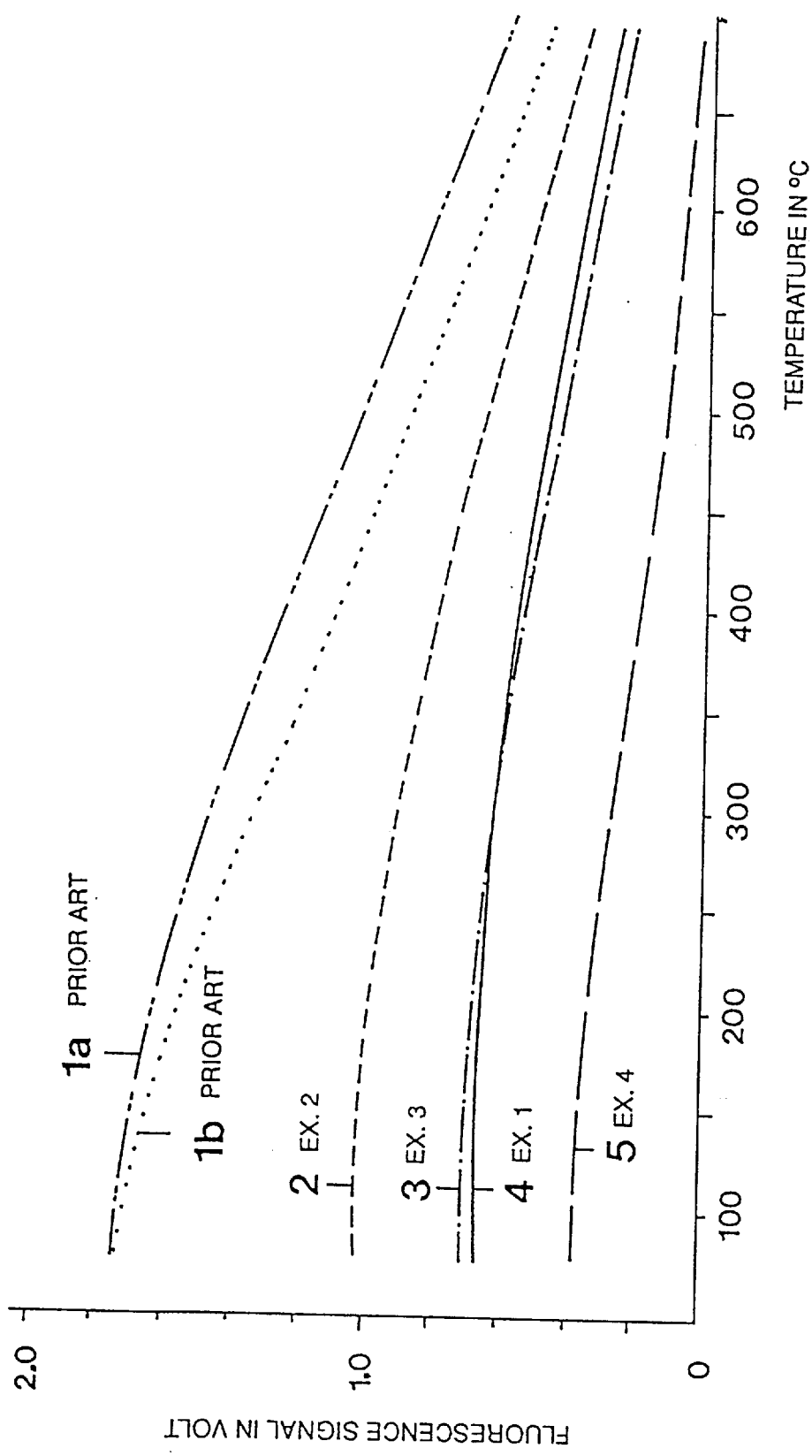
FIG. 4 is a graph, with respect to temperature (abscissa), of fluorescent radiation of a doped quartz glass in accordance with the above examples of the present invention, and in comparison with a quartz glass doped with cerium-titanium in accordance with the prior art (graphs 1a, 1b)

Referring now to FIG. 4, where the clear difference, with respect to fluorescence, of the light source envelope 10 is shown: In the entire temperature range of from between 25° C. to 650° C., the quartz glass doped in accordance with the first example of the present invention, see FIG. 4, curve 4, has a substantially reduced fluorescent signal with respect to the quartz glass in accordance with the prior art, FIG. 4, curve 1a, although the proportion of cerium in both samples of the quartz glass is approximately the same. The addition of praseodymium is responsible for the attenuation of the fluorescent radiation.

EXAMPLE 2

Figure 2:
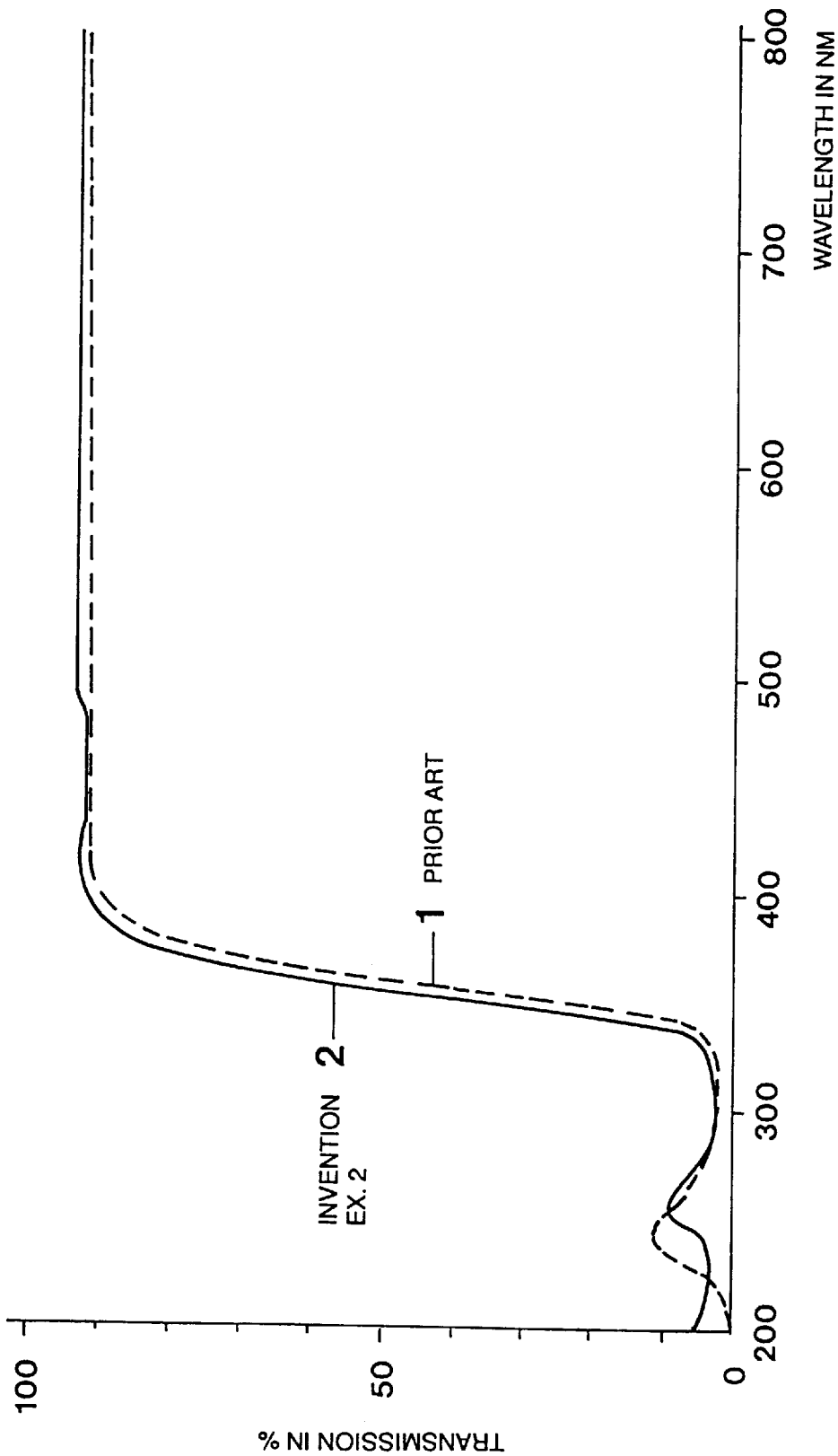

With Reference to FIG. 2:

The quartz-glass sample has a thickness of about 1 mm. The starting material is doped with 1.17% cerium praseodymium aluminate ($Ce_{0.6}Pr_{0.4}AlO_3$). In contrast to Example 1, the relative mol content of cerium to praseodymium in the cerium-praseodymium aluminate is 3/2. Consequently, the pure cerium component in the quartz glass can be calculated at 0.46% and the pure praseodymium content at about 0.31%, by weight. In spite of the overall smaller concentration of doping material, the quartz glass in accordance with the second example has a higher cerium content than the quartz glass of Example 1. The smaller remaining transmission in the wavelength below 300 nm is, apparently, based on the higher cerium content.

The remaining transmission in the wavelength range of about 270 nm, in Example 2, is below 10%. At wavelengths of about 300 nm, the transmission behavior of the two quartz-glass samples does not show any significant differences. The transmission behavior of a prior art cerium-titanium doped quartz-glass sample is shown for comparison purposes in curve 1 of FIG. 2. This sample has 1% cerium aluminate ($CeAlO_3$) and 0.05% titanium oxide ($TiO_2$) as doping materials. The pure cerium proportion here is about 0.65%, by weight. Above 300 nm, the two curves of FIG. 2 do not show significant differences. The remaining transmission of the cerium-titanium doped sample, see FIG. 2, curve 1, is shifted towards the short-wave UV range and is at about 245 nm. At about 12%, it is slightly higher than the remaining transmission of the quartz-glass sample in accordance with the present invention, see FIG. 2, curve 2.

The fluorescent signal emitted by the quartz-glass sample in accordance with Example is shown in FIG. 4, curve 2. Due to the higher cerium content, and the higher cerium-praseodymium mol relationship in a cerium-praseodymium aluminate, the degree of fluorescence is higher than in Example 1, FIG. 4, curve 4. Yet, the fluorescent signal of the quartz glass in accordance with Example 2, FIG. 4, curve 2, is still substantially less than a quartz-glass sample in accordance with the prior art, that is, doped only with a cerium-titanium doping substance, FIG. 4, curves 1a and 1b. Curve 1a relates to quartz glass doped with 0.5% cerium aluminate ($CeAlO_3$) and 0.04% titanium oxide ($TiO_2$) as described in connection with example 1 of FIG. 1B and curve 1b relates to quartz glass doped with 1.0% cerium aluminate ($CeAlO_3$) and 0.05% titanium oxide ($TiO_2$) as described in connection with example 2 of FIG. 2.

EXAMPLE 3

Figure 3:
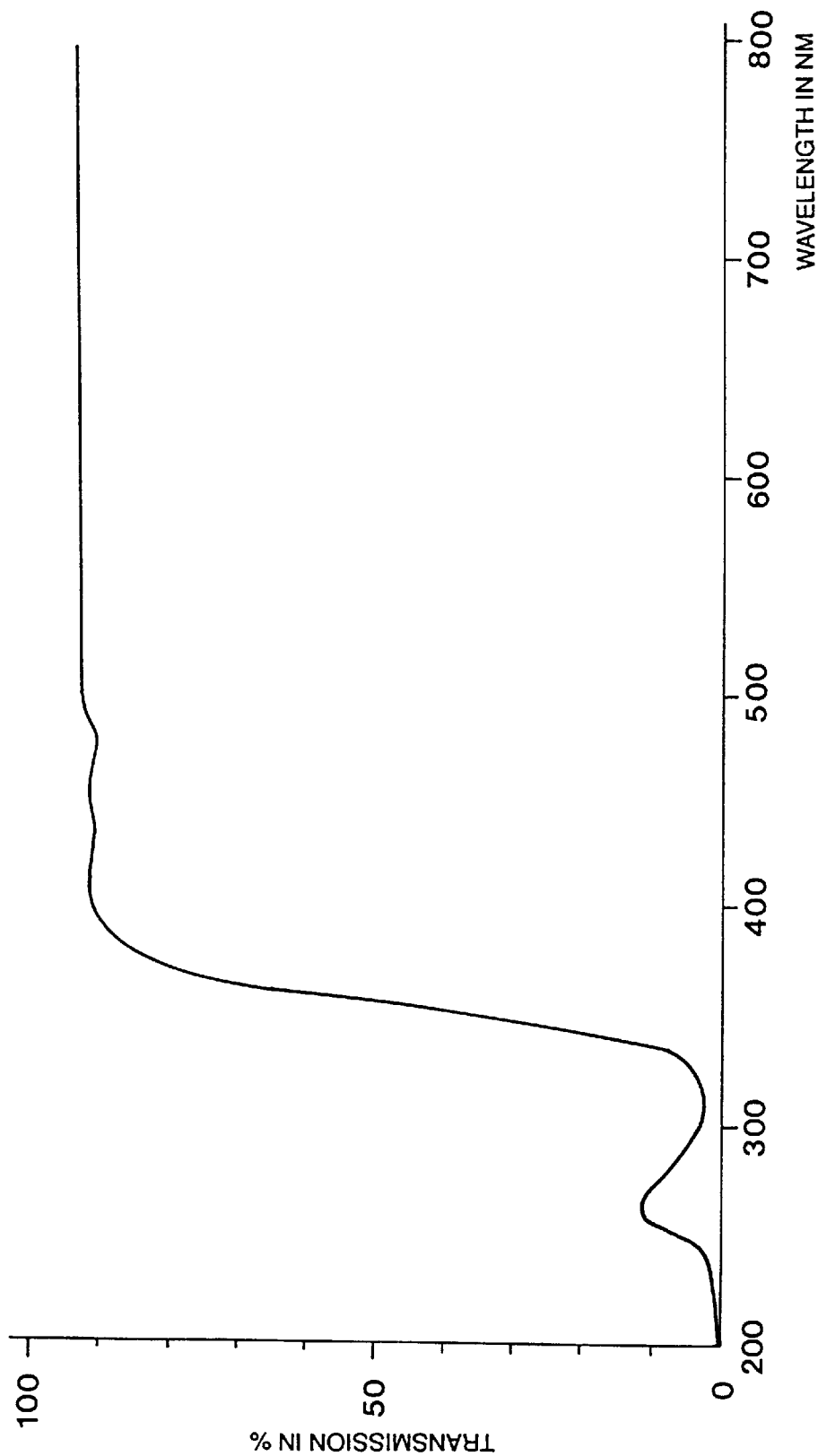
FIG. 3 is a transmission curve for a quartz glass doped with cerium-praseodymium titanium (0.5% $CeAlO_3$, 0.5% $Pr_6O_{11}$, and 0.04% $TiO_2$)

With Reference to FIG. 3:

The quartz-glass sample has a thickness of about 1 mm. It is doped with a cerium-praseodymium titanium doping mixture, having 0.5% cerium aluminate (CeAlO$_3$), 0.5% praseodymium oxide (Pr$_6$O$_{11}$) and 0.05% titanium dioxide (TiO$_2$). Starting material, again, is quartz sand or rock crystal. The doping additives are mixed, in powdered form, to the starting material. The cerium proportion in the quartz glass can be calculated to about 0.33%, the praseodymium content to about 0.41% and the titanium content to only about 0.03%.

For wavelengths above 300 nm, the transmission characteristics of this embodiment do not show significant differences with respect to the glasses of Example 1 or 2. The absorption edge again, as before, is in the range of about 340 nm to 350 nm. A slightly higher remaining transmission can be seen in the range of about 270 nm. For wave lengths below 240 nm, transmission of the quartz glass is negligible, due to the additional doping with titanium. The fluorescence of this embodiment is shown in FIG. 4, curve 3, and hardly differs from that of the first embodiment, FIG. 4, curve 4. Curve 3, illustrating the fluorescence condition of Example 3, is drawn in chain-dotted form.

EXAMPLE 4

The quartz-glass sample is made similar to that of Example 3, with a cerium-praseodymium titanium doping. Additionally, however, barium metaborate (BaB$_2$O$_4$) is added as a doping substance.

Overall, the doping in accordance with this embodiment is 0.5% cerium aluminate (CeAlO$_3$), 0.5% praseodymium oxide. (Pr$_6$O$_{11}$), 0.05% titanium oxide (TiO$_2$) and 1% barium metaborate (BaB$_2$O$_4$).

The transmission characteristics of this quartz-glass sample which, again, has a wall thickness of about 1 mm, is similar to that of Example 3, FIG. 3, since the barium metaborate influences the radiation transmission of the quartz glass within the wavelength of between 200 nm to 800 nm only insignificantly. The fluorescence of the quartz glass, however, is additionally substantially reduced by the addition of the barium metaborate, as seen when comparing curve 5 of FIG. 4 with curve 3 third example). In the relevant temperature range of about 650° C., which is significant for operation of lamp 12, the fluorescent signal of the embodiment of curve 5, FIG. 4, almost entirely disappears.

The addition of barium metaborate leads to a decrease of the viscosity of the quartz glass. Accordingly, the quartz glass of Example 4 is suitable only for lamp parts which are not highly loaded. For example, they can be used for vessels or bulbs 10 of low-power halogen incandescent lamps; they are particularly useful as surrounding shrouds, shields or outer envelopes 14 for high-pressure discharge lamps, that is, when the lamp 12 is a high-pressure discharge lamp.

The fluorescence signals, schematically represented at the ordinate in FIG. 4, were determined by means of a fluorescence sensor which transformed the fluorescence signal into a d-c voltage of less than about 2V. The test samples were heated in a furnace from room temperature up to 650° C. The temperature was measured by a thermocouple and a comparable reference element. To excite the blue fluorescent radiation of the cerium, the 365 nm radiation spectral line of a mercury high-pressure lamp was used. The quartz-glass samples were made from laboratory melted samples, polished flat on both sides, with a nominal wall thickness of about 1 mm, and specifically 1.2 mm.

Figure 5:
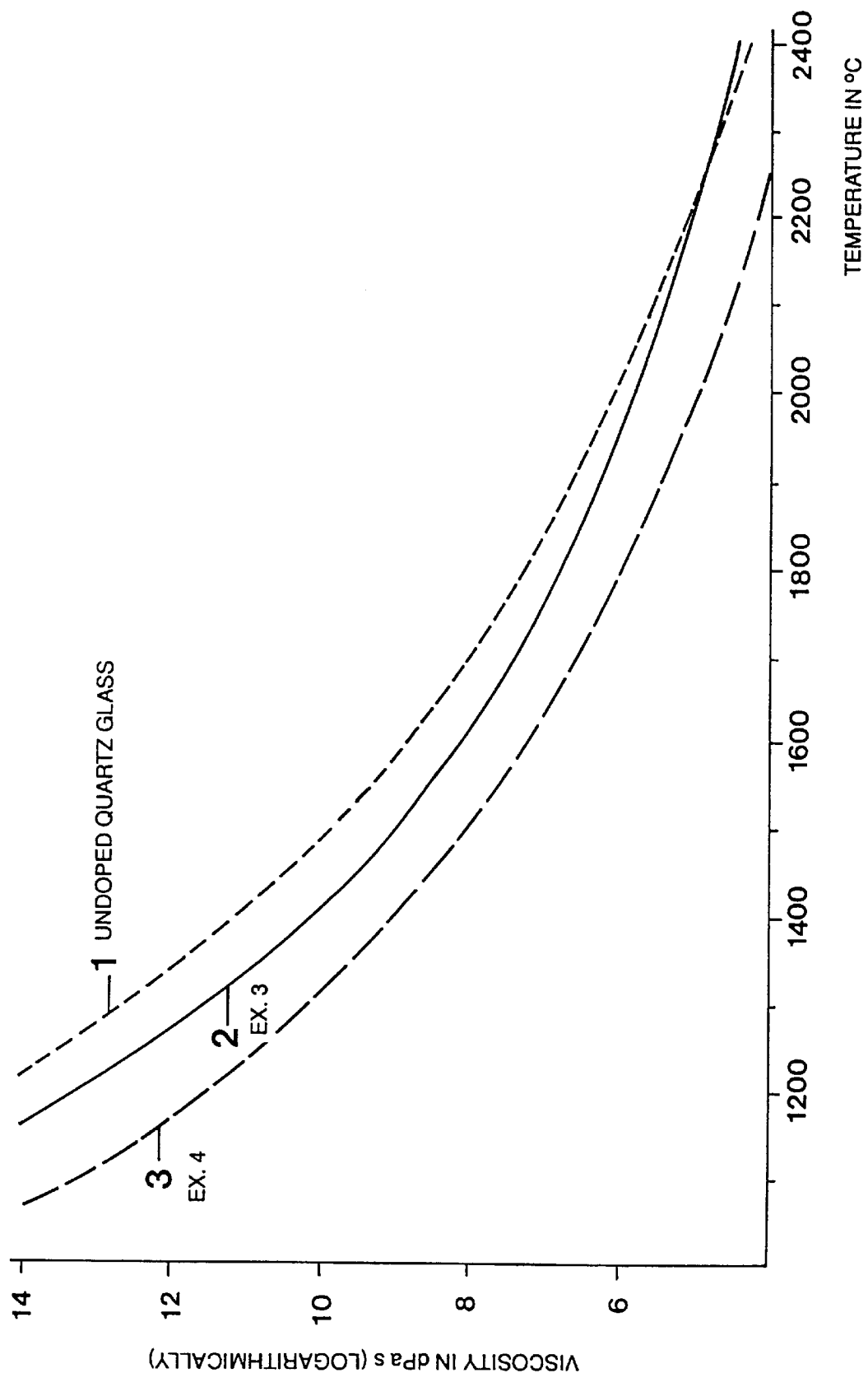
FIG. 5 illustrates the viscosity with respect to temperature (abscissa) of the quartz glass in accordance with the present invention, in comparison with undoped quartz glass (graph 1)

FIG. 5 illustrates the temperature dependency of viscosity. Viscosity in the range of from 1100° C. to 2400° C. of the quartz-glass samples of Example 3, curve 2, and Example 4, curve 3, were compared with quartz glass which was not doped, curve 1. The vertical axis illustrates the base 10 log of viscosity in deciPascal seconds (dPa s). The measurements were made by a drill viscosimeter.

The curves of FIG. 5 clearly show that the characteristic viscosity points at the lower cooling point, that is, at $10^{14.5}$ dPa s, the upper cooling point at $10^{13.0}$ dPa s, and the Littleton point at $10^{7.6}$ dPa s, are shifted in the doped quartz-glass samples towards lower temperatures.

The quartz glass in accordance with Example 4 (FIG. 5, curve 3 in dashed form), due to the viscosity points which are at comparable lower temperatures, is considered to be a "soft" quartz glass. Such a glass is not suitable for thermally extremely highly loaded elements, such as highly loaded lamp parts, typically discharge vessels of high-pressure discharge lamps. It can be readily used to form outer shields, shrouds or envelopes 14 (FIG. 1) and has the advantage of a low manufacturing temperature. Curve 2 of FIG. 5 shows the viscosity characteristics of a quartz-glass sample in accordance with the above-described Example 3. This is a "hard" quartz glass, also suitable for manufacturing thermally highly loaded discharge vessels of high-pressure discharge lamps.

The viscosity curves of the quartz-glass samples in accordance with the above-described Examples 1 and 2 are similar to those of curve 2 of FIG. 5. These glasses, also, are considered "hard" quartz glasses and thus are suitable for manufacturing thermally highly loaded lamp portions, such as the bulb 10 of a lamp 12. Since not all lamps require outer shields, shrouds or envelopes 14, the shroud 14 is shown in broken-line form in FIG. 1A.

EXAMPLE 5

Figure 6:
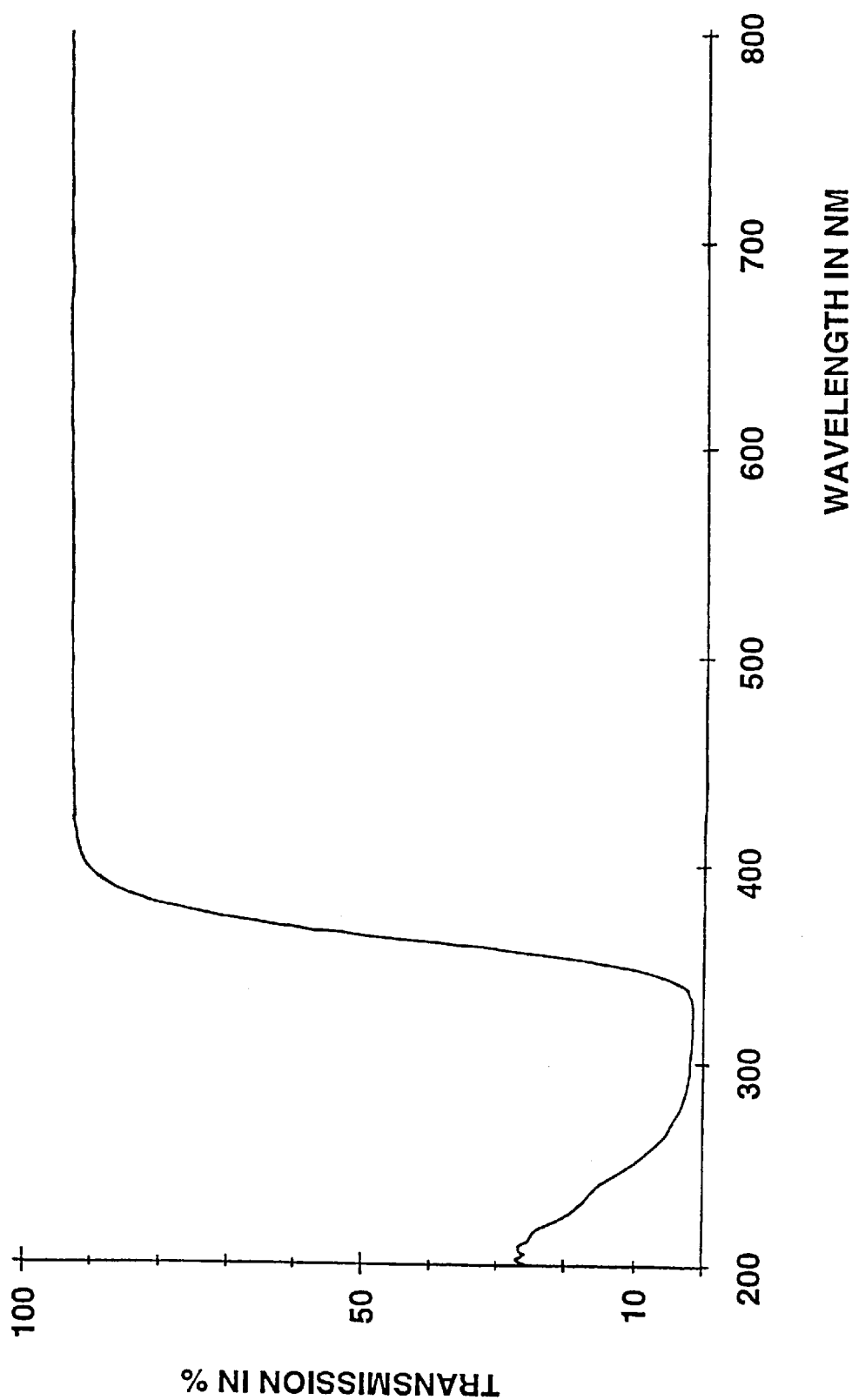
FIG. 6 is a transmission curve for a quartz glass doped with barium metaborate and cerium aluminate.
Figure 8:
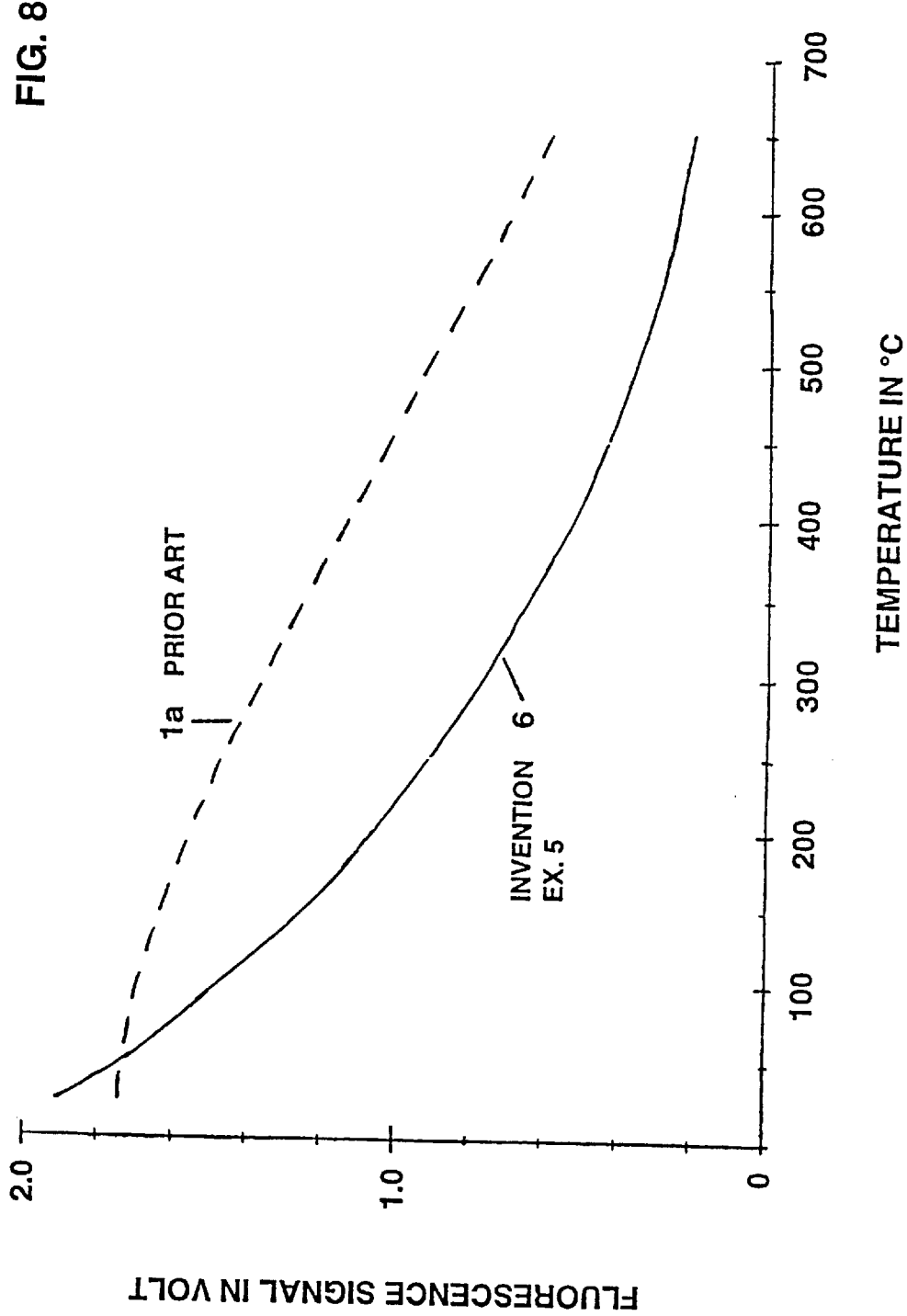
FIG. 8 is a graph showing the temperature dependence of fluorescence of quartz glass doped with cerium, aluminum, barium and boron, in contrast to a quartz glass in accordance with the prior art doped with cerium, aluminum and titanium dioxide.

With Reference to FIGS. 6 and 8:

Cerium, barium and boron are used to dope the quartz glass. The doping substances are added to quartz sand or pulverized rock crystal, respectively, which is used as the starting material for the quartz glass, in form of cerium aluminate and barium metaborate. For example, 1.0% of cerium aluminate (CeAlO$_3$), and 0.8% of barium metaborate (BaB$_2$O$_4$) are added to the quartz sand, or the rock crystal, respectively. This will result in a quartz glass with a cerium proportion of about 0.65%, a proportion of barium of about 0.49%, and a proportion of boron of about 0.08%. The percentages are all by weight.

The behavior with respect to fluorescence of the quartz glass in accordance with the fifth example is best seen in FIG. 8, see curve 6. This figure provides a direct comparison with a quartz glass doped with only 0.5% of cerium aluminate (CeAlO$_3$) and 0.04% of titanium dioxide (TiO$_2$), in accordance with the prior art (curve 1$a$). The fluorescence signal is shown in volts at the ordinate, with respect to temperature (abscissa). The temperature-dependent fluorescence signals were measured, as described in connection with examples 1–4, by means of a luminescence sensor, which transduces the fluorescence signal in a d-c voltage. Excitation of the blue fluorescence radiation of the cerium is obtained by means of a mercury vapor high-pressure discharge lamp emitting a 365 nm line. The quartz-glass samples are formed of double-sided ground polished laboratory quartz-glass samples having a wall thickness of 1.2 mm.

Direct comparison of the curves 1$a$ and 6 of FIG. 8 clearly shows that within the temperature range of from 100° C. to 650° C. the fluorescence radiation of the quartz glass in accordance with the present invention—curve 6—is clearly less than the fluorescence radiation of the quartz glass in accordance with the prior art, curve 1a. Decrease of the fluorescence radiation is based on the doping additive of barium metaborate.

EXAMPLE 6

Figure 7:
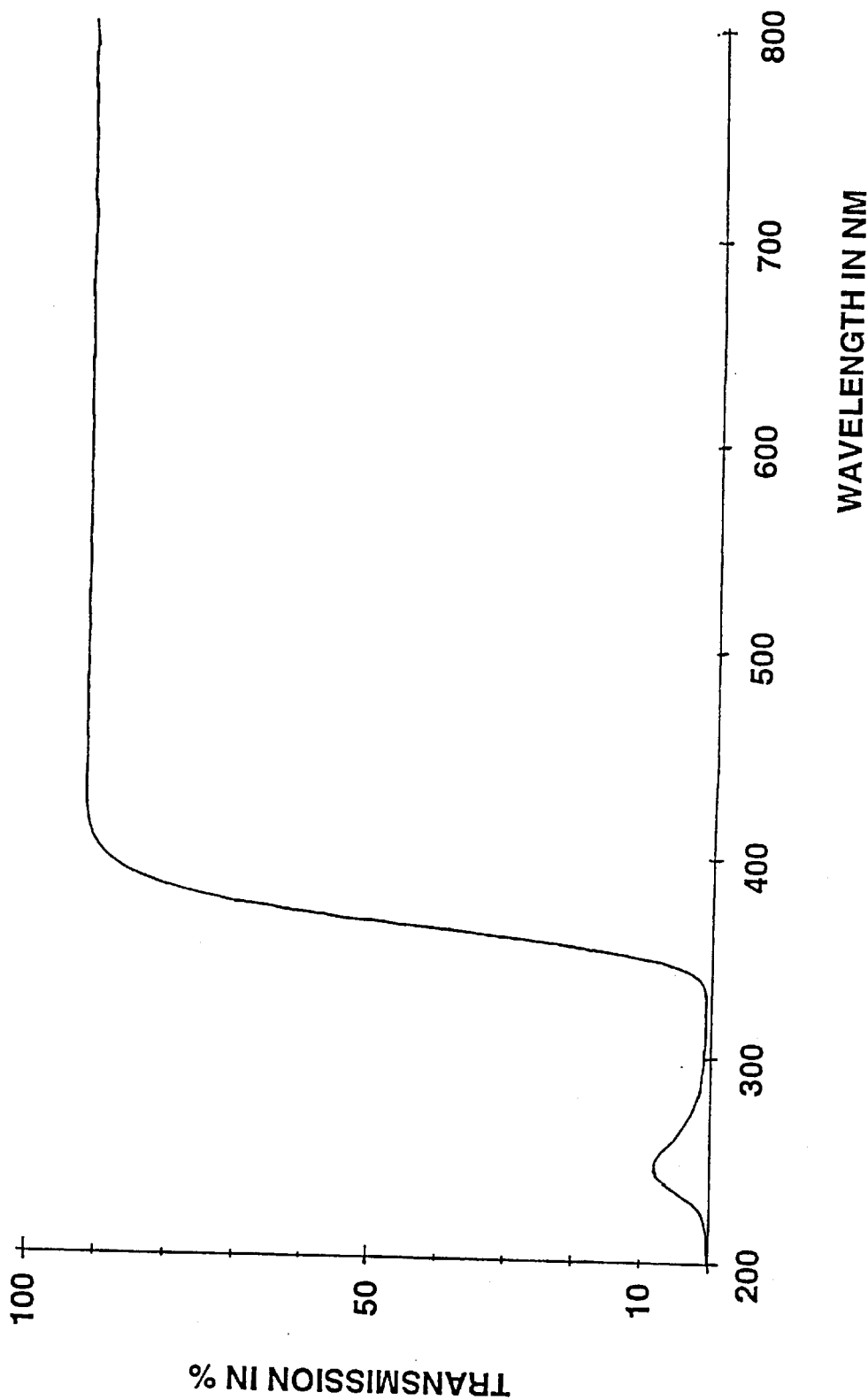
FIG. 7 is a transmission curve for quartz glass doped with cerium aluminate and barium metaborate and a small amount of titanium dioxide.
Figure 9:
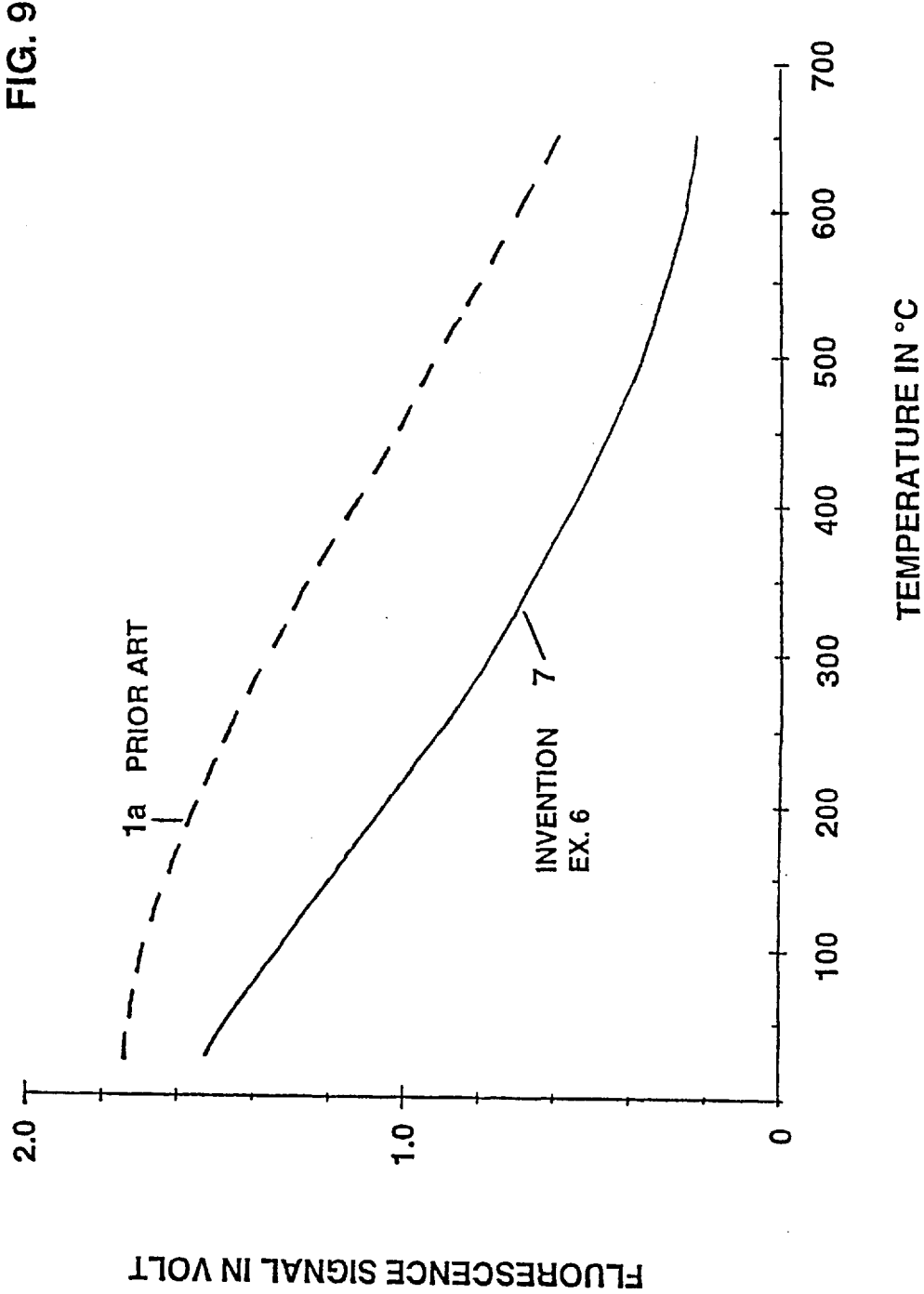
FIG. 9 is a graph showing the temperature dependence of fluorescence of a quartz glass doped with cerium, aluminum, barium and boron, and a small addition of titanium dioxide.

With Reference to FIGS. 7 and 9:

The quartz lass in accordance with example 5 has, additionally, 0.05% titanium dioxide in the doping substances. Thus, 1.0% cerium aluminate and 0.8% barium metaborate had added thereto 0.05% titanium dioxide. The cerium-barium-boron components of the quartz glass, otherwise, are the same as those in the fifth example, whereas the titanium proportion is 0.03%, all by weight.

The transmission of the quartz glass in accordance with the sixth example is shown in FIG. 7 over the spectral range of from 200 to 800 nm, transmission again being shown on the ordinate in percent with respect to the intensity of radiation impinging on the quartz-glass sample. The wall thickness of the quartz-glass test sample was 1 mm.

The fluorescence behavior of the quartz glass, see curve 7, can be directly compared with the state of the prior art by considering the curves of FIG. 9. The prior art curve 1a of FIG. 9 again is a quartz glass doped with 0.5% of cerium aluminate ($CeAlO_3$) and 0.04% titanium dioxide ($TiO_2$). The fluorescence signal, shown in volts at the ordinate with respect to temperature is clearly illustrated. The temperature-dependent fluorescence signals were determined as before; the quartz-glass sample, as before, is made of laboratory melts, having a wall thickness of 1.2 mm, and then ground and polished on both sides.

Direct comparison of the curves 1a and 7 of FIG. 9 shows that in the temperature range of between 100° C. to 650° C., fluorescence radiation of the quartz glass in accordance with the present invention—curve 7—is clearly less than the fluorescence radiation of the quartz glass according to the prior art, curve 1a. The decrease of fluorescence radiation is based on the addition of barium metaborate. The titanium dioxide doping further improved the absorption of the quartz glass in the short-wave UV spectral range, that is, the range of UV-C, in wavelengths of between 200 and 300 nm, as is clearly shown by comparing the transmission curve 6 of the fifth example with the transmission curve 7 of the sixth example in FIG. 7.

Figure 10:
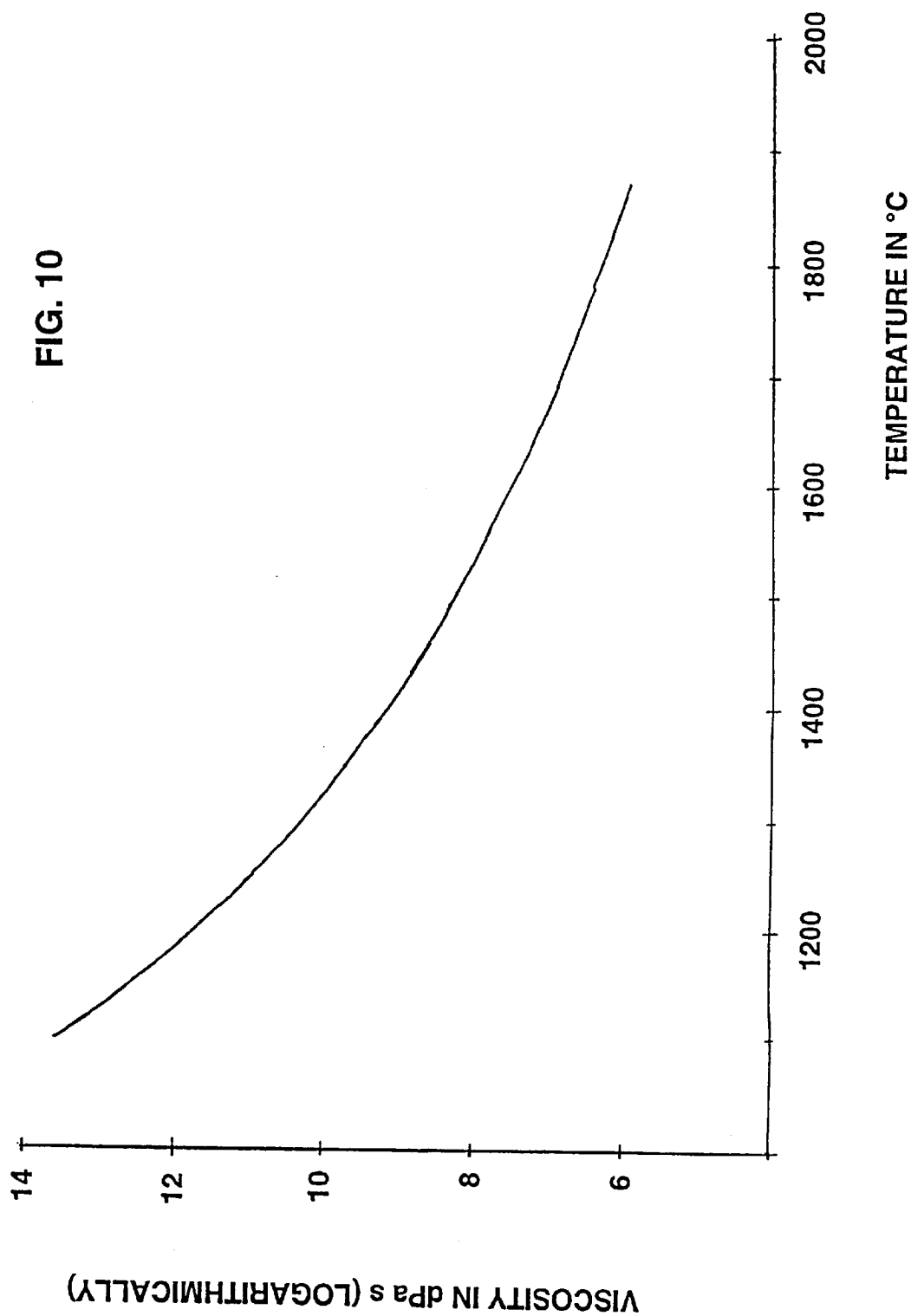
FIG. 10 is a graph of viscosity in dependence on temperature of a quartz glass doped with cerium, aluminum, barium and boron and a small quantity of titanium dioxide.

Temperature dependence on viscosity for the quartz glass of the sixth example is shown in FIG. 10. The vertical axis shows the base-10 log of the viscosity in deciPascal second (dPa s) with respect to temperature in degree C at the abscissa. The curve of FIG. 10 was derived by means of a drill viscosimeter. The quartz glass of the fifth and sixth examples is "soft" quartz glass. Soft quartz glasses are eminently suitable for manufacturing lamp bulbs for halogen incandescent lamps.

The doping substances in the quartz glass are optimized with respect to a wall thickness of the quartz-glass sample of about 1.0 mm. The proportion of cerium in the quartz glass must be increased if samples of lesser wall thicknesses are used, in order to ensure an equally good UV radiation absorption. The doping substances which interfere with fluorescence, then, must be correspondingly increased, so that higher doping quantities are required. If the wall thickness is increased, however, lesser quantities of doping substances for equally good UV absorption and fluorescence suppression can be used, since absorption increases with the thickness of the sample.

The present invention is not limited to the examples described. For example, the cerium-praseodymium relationship and the cerium-praseodymium aluminate ($Ce_xPr_{1-x}ALO_3$, wherein $0<x<1$), in accordance with the embodiments of Examples 1 and 2, can be suitably varied. The doping materials may be added to the quartz glass or rock crystal also in other forms. For example, cerium and praseodymium can be added as a mixture of cerium aluminate and praseodymium aluminate, or as oxides or silicates, to the quartz-glass melt. The upper limit for the cerium and praseodymium proportion within the quartz glass is determined by solubility of the respective doping substances within the quartz glass, and by the maximum permitted decrease in viscosity. Upper limits for the cerium or praseodymium proportion within the quartz glass are in the order of about 2.5% by weight for suitable commercial applications of the glass. The addition of barium metaborate, which also suppresses fluorescence, but decreases the viscosity, can be increased up to a proportion of about 2% by weight, particularly if used with soft quartz glass with low working temperature. The examples given, thus, illustrate particularly preferred embodiments for use in halogen incandescent lamps and high-pressure discharge lamps which, otherwise, can be of any suitable and commercial configuration, with or without an external envelope 14, as desired.

In general, the proportion of cerium, with reference to undoped quartz glass, is between about 0.06 and 1%, by weight; and the proportion of praseodymium, with reference to undoped quartz glass, is between about 0.008 and 1.25%, by weight. Barium metaborate ($BaB_2O_4$) can be present in the quartz glass between 0.01 and 2%, by weight, alone or with titanium, e.g. in form of titanium dioxide ($TiO_2$), present between about 0.01 and 0.3%, by weight. Overall, the quartz glass, with reference to undoped quartz glass, comprises between about 0.1 and 1.5% cerium aluminate ($CeAlO_3$), 0 to 0.3% titanium dioxide ($TiO_2$), the cerium aluminate and titanium dioxide forming a first doping additive; and 0.01 to 2.0% barium metaborate ($BaB_2O_4$) and 0 to 1.5% praseodymium oxide ($Pr_6O_{11}$). The praseodymium oxide and barium metaborate can form the sole or combined doping materials.

We claim:

1. A lamp (12) having a lamp bulb or vessel (10) of quartz glass, and a light source (11) which, in operation, emits radiation in the ultraviolet, (UV) spectral range, located in said quartz-glass bulb or vessel (10), wherein the quartz glass of the bulb or vessel includes a first doping material comprising cerium, or a cerium compound, absorbing UV radiation, and being stimulated to fluorescence within the visible spectrum by said UV radiation;

wherein the quartz glass of the bulb or vessel additionally includes a further doping material for suppressing, or at least substantially attenuating said fluorescence of the quartz glass of the bulb or vessel (10), said further doping material comprising barium and boron.

2. The lamp of claim 1, wherein the proportion of cerium is between about 0.06 and 1%, by weight.

3. The lamp of claim 1, wherein said first doping material comprises cerium aluminate ($CeAlO_3$).

4. The lamp of claim 1, wherein said barium and boron of said further doping material comprises barium metaborate ($BaB_2O_4$), said barium metaborate being present in the quartz glass between about 0.01 and 2%, by weight.

5. The lamp of claim 1, wherein the first doping material includes titanium or a titanium compound.

6. The lamp of claim 5, wherein the titanium compound comprises titanium dioxide ($TiO_2$), and is present between about 0.01 and 0.15%, by weight.

7. The lamp of claim 1, wherein the quartz glass comprises between about 0.1 and 1.5% cerium aluminate ($CeAlO_3$), 0 and 0.3% titanium dioxide ($TiO_2$), said cerium aluminate and titanium oxide forming the first doping material; and said barium and boron of said further doping material is present in form of between 0.01 and 2% barium metaborate ($BaB_2O_4$), said barium metaborate forming said further doping material, all percentages by weight.

8. The combination of a radiation source which emits radiation in the ultraviolet (UV) spectral range with a quartz glass, subjected to said radiation, wherein said quartz glass includes a first doping material comprising cerium, or a cerium compound, absorbing UV radiation, said quartz glass being stimulated to fluorescence within the visible spectrum by said UV radiation; and wherein the quartz glass includes a further doping material for suppressing or at least substantially attenuating said fluorescence of the quartz glass when subjected to said radiation, said further doping material comprising barium and boron.

9. The lamp of claim 8, wherein the proportion of cerium is between about 0.06 and 1%, by weight.

10. The lamp of claim 8, wherein said first doping material comprises cerium aluminate ($CeAlO_3$).

11. The lamp of claim 8, wherein said barium and boron of said further doping material comprises barium metaborate ($BaB_2O_4$), said barium metaborate being present in the quartz glass between about 0.01 and 2%, by weight, with reference to undoped quartz glass.

12. The lamp of claim 11, wherein the first doping material includes titanium or a titanium compound.

13. The lamp of claim 8, wherein the titanium compound comprises titanium dioxide ($TiO_2$), and is present between about 0.01 and 0.3%, by weight, with reference to undoped quartz glass.

14. The lamp of claim 8, wherein the quartz glass, with reference to undoped quartz glass, comprises between about 0.1 and 1.5% cerium aluminate ($CeAlO_3$), 0 and 0.3% titanium dioxide ($TiO_2$), said cerium aluminate and titanium dioxide forming the first doping material; and said barium and boron of said further doping material is present in form of between 0.01 and 2% barium metaborate ($BaB_2O_4$), said barium metaborate forming said further doping material, all percentages by weight.

* * * * *